July 21, 1970        R. B. BRITTON ET AL        3,521,207
POWER SUPPLY FOR SUPERCONDUCTING MAGNET
Filed Sept. 27, 1968

*INVENTORS.*
RICHARD B. BRITTON
WILLIAM B. SAMPSON

United States Patent Office 3,521,207
Patented July 21, 1970

3,521,207
POWER SUPPLY FOR SUPERCONDUCTING MAGNET
Richard B. Britton, Setauket, and William B. Sampson, Bellport, N.Y., assignors to the United States of America as represented by the United States Atomic Energy Commission
Filed Sept. 27, 1968, Ser. No. 763,260
Int. Cl. H01f 7/22
U.S. Cl. 335—216
4 Claims

ABSTRACT OF THE DISCLOSURE

Power supply for a superconducting magnet connected to provide a smoothly increasing low cost energization of the magnetic and large magnetic fields therein with reduced flux jumps and reduced lead losses.

BACKGROUND OF THE INVENTION

In the field of physics a need exists for an efficient, inexpensive, smoothly increasing current supply for energizing a superconductor magnet coil for producing a strong magnetic field in the bore thereof. These superconductor magnets operate below about 17.5° Kelvin and are of interest particularly at temperatures just below the critical temperature of the magnets where they are subject to flux jumps, i.e., temporary, localized, normal resistance conditions that can rapidly multiply from one part of the magnet to another, as described on p. 115 et seq. of the March 1961 Sci. American. Conventional power sources have been inefficient, impractical or troublesome because they have been expensive, have not had smoothly increasing current or they have had ripple whereby they have produced "flux jumps" in the magnets at such frequent intervals that it has been difficult to keep the magnets from quenching or going completely normal. It has thus been difficult, expensive and time consuming predictably to produce large magnetic fields therewith. It is additionally advantageous to reduce the lead losses to high current superconducting magnets operated in a liquid gas cooling fluid, such as liquid helium, where the exit gas is rarefied.

It is an object of this invention therefore to provide an economical and practical apparatus and method for the energization of a superconductor magnet for the production of a magnetic field therein by the use of dissimilar lead-in elements;

It is a further object to provide means for reducing flux jumps for practically, safely and efficiently, producing large magnetic fields in superconductor magnets;

It is a further object to provide means for reducing flux jumps for practically, safely and efficiently, producing large magnetic fields in superconducting magnets;

It is a further object to provide low lead losses in high current superconducting magnets operated in superfluid cooling fluid where the exit gas is rarefied.

BRIEF SUMMARY OR THE INVENTION

The invention described herein was made in the course of, or under a contract with the U.S. Atomic Energy Commission.

This invention provides method and apparatus for the energization of superconductor magnets, such as described in U.S. Pat. 3,356,976 to Sampson et al., that operate below about 17.5° K. for producing magnetic fields in the kilogauss range. More particularly, this invention involves the use of particular metallic bars connected across a low resistance for producing high magnetic fields in the bore of superconducting magnets. These bars are arranged in one embodiment, to cooperate with particular external energy sources imposed adjacent the low resistance connection between the bars to build up within the superconducting magnet a smoothly increasing current flow and infrequent flux jumps. With the proper selection of components and arrangements, as described in more detail hereinafter, the desired high magnetic fields, infrequent flux jumps and inexpensive, dependable power supply is achieved.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE SEVERAL VIEWS OF THE DRAWING

In the figures where like elements are referenced alike.

DETAILED DESCRIPTION

This invention is useful in energizing high field superconducting magnets, such as described in the above-cited U.S. patent, which is assigned to the assignee of this invention. For example, the system of this invention has actually produced a 47 kilogauss field in such a magnet. It will be understood, however, that this invention is useful in a wide variety of superconducting and cryogenic applications since this invention can be used in any cryogenic or superconducting device requiring large magnetic fields and/or high current leads. To this end, this invention utilizes specific, inexpensive, dissimilar, thermoelectric effect producing bars. In the preferred embodiment, pure copper and pure nickel bars are used, but other suitable materials, comprise bismuth, iron, chromel and constantan (an alloy of copper and nickel). The first ends of the bars are relatively hot and the other ends are at about 17° K. Moreover, as described in more detail hereinafter, these bars are connected in a specific configuration to a magnet of the type described in the above referenced Sampson et al. patent to provide efficient low loss leads, high currents, and high fields while reducing "flux jumps."

Figure 1:
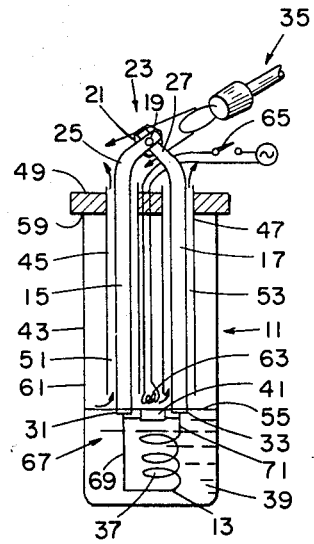
FIG. 1 is a partial cross-section of one embodiment of this invention.

Referring now to FIG. 1, the apparatus 11 of this invention that energizes a magnet 13, such as that described in the above-cited Sampson et al. patent, comprises bars 15 and 17 of pure copper and nickel that are held together across a low resistance connection, for example, by bolt 19 and nut 21, which pass through holes in the bars 15 and 17 and squeeze the bars together across an interface to form a low normal resistance 23. When first ends 25 and 27 of bars 15 and 17 are connected across resistance 23 at ambient temperature or above and second ends 31 and 33 of bars 15 and 17 are connected to the ends of a superconducting coil, such as magnet 13, a temperature gradient of several hundred degrees Kelvin is produced from the one end to the other end of bars 15 and 17. By heating the ambient ends 25 and 27 to a dull red with suitable heat source means 35, such as a torch, higher temperature gradients are produced. These temperature gradients produce a smoothly increasing current flow in magnet 13 that produces a high field in the bore 37 of the magnet. To this end, bar 15 is connected from end 31 thereof to one end of the coil of super-conductor magnet 13 which is immersed in liquid helium 39, and bar 17 is connected from end 33 thereof to the other end of the magnet 13. When the desired field is produced in the bore of magnet 13, a suitable means 41, such as the well known temperature actuated switches that open and close by a localized temperature change of the switch above or below the critical temperature of a superconductor therein, connect the ends of magnet 13 directly to maintain the field in the bore of the magnet 13.

Since the interface area of contact of the resistance 23 is less than the cross-sectional area of the bars 15 and 17, the resistance 23 has a higher opposition to electrical current flow therein than the bars themselves. To this end, the bars when free of dust, grease or oxide formation are actually separated at a number of places across resistance 23 due to waviness, roughness, lack of flatness, the irregularity of the surfaces or due to the difference in the radii of curvature of the surfaces. Thus, even within the area actually in contact there exists only microscopical spots of contact. Moreover, this interface across resistance 23 can be adjusted within narrow limits by adjusting the pressure holding the bars together across the interface and/or by providing small amounts of thermal conducting grease at the interface between the bars 15 and 17 before assembling the bars together and heating them at the interface to high temperatures. In this regard the electrical resistance is related to the thermal conductance across the interface joint. The latter is determined for perfectly flat pieces in contact by the formula $$h = \frac{2P_a K_{ij}}{H a_{mi}}$$

where $P_a$ is the apparent contact pressure, $K_{ij}$ is the combined thermal conductivity when heterogeneous materials are used for the joint, $H$ is the hardness of the harder material, and $a_{mi}$ is the radius of each microscopic contact area, which is assumed to be circular for simplicity.

In one practical embodiment, the bars 15 and 17 comprise a ¼″ diameter pure copper rod 15 and a ½″ diameter pure nickel rod 17. Upon heating ends 25 and 27 to a dull cherry red color for one hour with a heat source means 35, such as an acetylene torch, the thermoelectric effect producing means 11 produced a 47 kilogauss field in a 1⅛″ bore Nb-Zr superconducting coiled magnet 13 having a 2½″ length, and a maximum low peak current rating of 35 amps. Upon removing the heat source 35 and exposing the ends 25 and 27 of bars 15 and 17 to the heat source presented by the ambient room temperature, the field only reduced to about 10 kg. It was found that the larger the cross-section of bars 15 and 17, the faster the peak field was achieved and the larger the remaining field after the heat source 35 was removed.

by evaporation from the liquid helium surface 55 through channels 51 and 53. Also, this system utilizes the evaporating gas efficiently to help maintain the desired temperature gradient across the apparatus 11 and to maintain minimal heat input into the liquid helium in vessel 43. The ends 31 and 33 of bars 15 and 17 are connected to the opposite ends of the coil of magnet 13, the ends 25 and 27 of the bars 15 and 17 are connected to form low resistance 23, and the magnet 13 is inserted into the liquid helium 39 so that cover 49 closes against the top 59 of sides 61 of vessel 43. Then, the ends 25 and 27 of bars 15 and 17 are heated to 250°–1000° K. by heat source 35, such as an oxyacetylene torch or any other suitable heating means, such as an electric heater, to produce the above-described 47 kilogauss field in bore 37 of magnet 13. Thereupon, small localized heat source 63 is removed from superconducting switch 41 by opening normal resistance switch 65 whereby the liquid helium 39 in vessel 43 causes the switch 41 to become superconducting and to connect the opposite ends of the coil of magnet 13 to maintain this high 47 kilogauss field in the bore 37 of magnet 13 while heat source 35 is removed from the ends 25 and 27 of bars 15 and 17.

It has been found in practice, that the cold end 33 of the nickel bar 17 has a negative polarity while the cold end 31 of the copper bar 15 has the opposite, or positive polarity. Also, the EMF obtained with a temperature gradient from the cold ends to the hot ends of bars 15 and 17 of about 300° K. is about 3.30 millivolts on open circuit with switch 41 open. The output voltage of $$\frac{3.30}{2} = 1.65 \, mv.$$

or half the open circuit voltage, is related to the fact that a power source will deliver maximum power to a load when the load impedance is equal to the generator internal impedance. In this regard, the internal impedance of apparatus 11 does not vary much with load current and is assumed to be constant.

In selecting the above described materials for bars 15 and 17, the temperatures vs. absolute millivolts obtainable with various of these metals and metal alloys is matched to provide the desired output power. Thus in an apparatus 11 having a nickel bar 17, which has a negative absolute EMF at the described temperature gradient from end 27 to end 33 thereof of several hundred degrees, this bar 17 may be matched with a copper or an iron bar 15 since iron has a positive absolute EMF at the same temperature gradient from one end to the opposite end thereof. In actual practice, the absolute EMF of a Fe-Ni combination, is about 9.37 at a temperature gradient of about 373° K. from the hot end to the cold end thereof as shown by the following table.

ABSOLUTE EMFS OF T.E. ELEMENTS

| Temp. grad. from hot to cold end, degrees | Ni | Fe | Cu | Cu-Ni | Fe-Ni | Chromel | Chr-Cons | Constantan |
| --- | --- | --- | --- | --- | --- | --- | --- | --- |
| 0–4.2° | 0 | 0 | 0 | 0 | 0 | 0 | 0 | 0 |
| 73 | −.52 | +0.28 | −0.19 | [1] 1.33 | [2] .80 | +.64 | [3] 1.29 | −.65 |
| 173 | −1.58 | +1.36 | −0.37 | 1.21 | 2.94 | −1.80 | 4.82 | −3.02 |
| 273 | −2.80 | +3.2 | 0 | 2.80 | 6.00 | +4.00 | 10.00 | −6.00 |
| 373 | −4.28 | +5.09 | +0.76 | 5.04 | 9.37 | +6.81 | 16.32 | −13.45 |
| 473 | −5.90 | +6.74 | +1.83 | 7.73 | 12.64 | +9.96 | 23.41 | −17.71 |
| 573 | −7.39 | +8.05 | +3.15 | 10.54 | 15.44 | +13.32 | 31.03 | −22.19 |
| 673 | −8.25 | +9.08 | +4.68 | 12.93 | 17.33 | +16.95 | 38.94 | −26.79 |
| 773 | −8.96 | +9.99 | +6.41 | 15.37 | 18.95 | +20.21 | 42.00 | −31.47 |
| 873 | −9.84 | +11.00 | +8.34 | 18.18 | 20.84 | +23.62 | 55.09 | −36.17 |
| 973 | −10.90 | +12.32 | +10.48 | 21.38 | 23.22 | +26.95 | 63.12 | −40.84 |
| 1,073 | −12.14 | +14.05 | +12.83 | 24.97 | 26.19 | +30.22 | 71.06 | −45.43 |
| 1,173 | −13.48 | +16.04 | +15.40 | 28.88 | 29.52 | +33.40 | 78.83 | −49.91 |
| 1,273 | −14.93 | +17.50 | +18.19 | 33.12 | 32.43 | +36.51 | 86.42 | −86.42 |

[1] (Cu). [2] (Fe). [3] (Chr).
 (+)   (+)   (+)

In the operation of the apparatus 11 of FIG. 1, liquid helium 39 partially fills vessel 43, which is a suitable insulated cryostat having insulated walls spaced across a vacuum to form a conventional dewar. The bars 15 and 17 are formed with small conduits 45 and 47 connected to cover 49 of vessel 43 to form small outlet channels 51 and 53 for rarefied helium that escapes from vessel 43

In the described apparatus 11, the efficiency of the bar material selected is directly proportional to the output voltage per degree temperature gradient difference from the hot end to the cold end thereof, the electrical conductivity averaged over the total temperature gradient difference from the hot end to the cold end thereof, and inversely proportional to the thermal conductivity $k$ over the same temperature interval. Stated in equation form, the efficiency is $$\frac{\text{volts/degree} \times \sigma}{k}$$

It has been found that $\sigma$, $k$ and T° are related by $$\frac{k}{\sigma T} = \text{constant}$$

Also, the electrical conductivity tends to increase as the temperature decreases and the thermal conductivity tends to decrease as the temperature decreases while the voltage output (EMF) decreases with temperature. Thus, as the thermal conductivity $k$ is reduced, and as the electrical conductivity $\sigma$ is increased, the efficiency increases. It is clear, therefore, that the ratio $k/\sigma$ is to be minimized for the best efficiency. However, since the voltage/degree value decreases with temperature to zero at 0° K., the cold end of bars 15 and 17 must be kept as high in temperature as possible.

In view of the latter, the cold end 67 of the apparatus 11 of this invention advantageously operates at a temperature of down to only 17° K. at ends 31 and 33 of bars 15 and 17 and commercially available ribbons 69 and 71 that remain superconducting from 0° K. to 17.5° K. connect the ends of bars 15 and 17 respectively with the opposite ends of the coil of magnet 13. One material for such leads, for example, is $Nb_3Sn$. Thus, the thermoelectric effect producing apparatus 11 need only deliver its power to magnet 13 at 17° K. where it is connected to leads 69 and 71 while below the location of that connection the superconducting leads flow the current, which may be up to several thousand amperes, without electrical resistance losses. However, as superconductor ribbons become available that are made from materials having critical temperatures of 20.7° K. or higher, such as the Nb-Ge-Al combination made at the Bell Telephone Laboratories, the temperature of cold end 67 may be raised accordingly. In this regard, the leads 69 and 71 are in the form of ribbons having thin cross-sections advantageously up to only .010 thick whereby the lengthwise thermal conductivity thereof is small from the cold ends of bars 15 and 17 into the bath of liquid helium 39 in vessel 43.

The described system of this invention has the advantage of inexpensively and efficiently producing high magnetic fields by providing a practical, efficient and inexpensive power source for superconducting magnets without elaborate cooling channels therein. Additionally, the dissimilar gas cooled bars 15 and 17 of this invention provide efficient lead-in elements for superconducting magnets by providing low resistance current paths that substantially reduce the resistance heating of the conventional normal resistance leads known heretofore and by efficiently utilizing the cooling gas that evaporates from the top surface 55 of the helium 39 in vessel 43. To this end the vent gas is advantageously passed back to a helium compressor for reuse in vessel 43 and low thermal conductivity adjustable valves 73 are used at the end of each channel 51 to equalize the helium gas flow therein. Moreover, this invention provides smoothly increasing current that substantially reduces the flux jump and quenching difficulties produced by the conventional power sources known heretofore wherein the required current and ripple control have been difficult and/or expensive.

Figure 2:
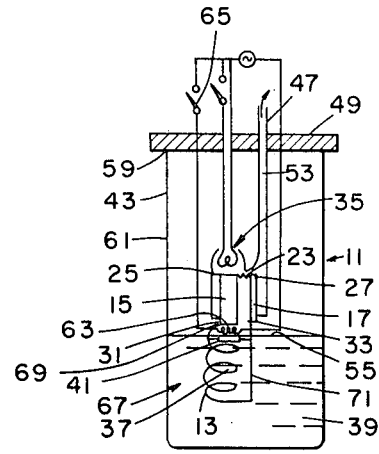
FIG. 2 is a partial cross-section of another embodiment of this invention.

Referring to FIG. 2 an electric heat source 35 is employed to heat one end of apparatus 11. In this embodiment bars 15 and 17 comprise bismuth and copper connected across resistance 23 at one end to leads 69 and 71 at the other end for energizing superconducting magnet 13 in liquid helium 39 to produce a strong kilogauss field in the magnet bore 37. The system, like that of FIG. 1 also reduces losses and likewise provides a smoothly increasing current that substantially reduces flux jumps in magnet 13.

Figure 3:
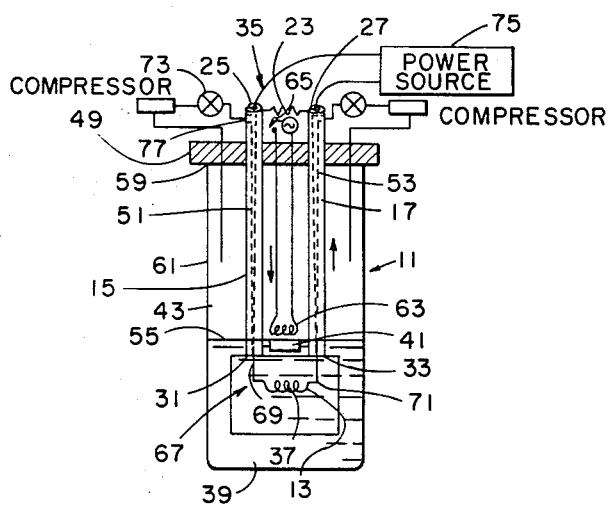
FIG. 3 is a partial cross-section of another embodiment of this invention.
Figure 4:
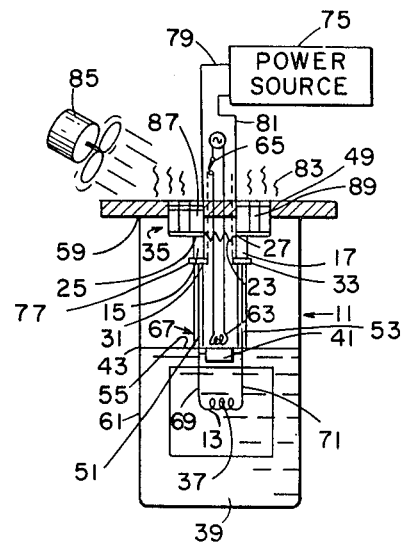
FIG. 4 is a partial cross-section of another embodiment of this invention.

The latter advantage is also apparent from the apparatus shown in FIGS. 3 and 4, wherein an inexpensive variable input power source 75 is shown connected to bars 15 and 17 with a small resistance 23, shown schematically for ease of explanation, connected therebetween at the bar ends 25 and 27. The power source 75 produces an increasing current flow in bars 15 and 17, corresponding to the increasing current flow produced by bars 15 and 17 alone, to produce an increasing magnetic field in the bore 37 of magnet 13, up to 47 kilogauss or above without quenching. To this end if localized flux jumps produce a small resistance in magnet 13 that is higher than across resistance 23, the current from source 75 will by-pass magnet 13 by taking the alternate path provided by resistance 23. This enables the helium 39 in vessel 43 quickly to cool one or more localized flux jump areas sufficiently to remove the flux jumps whereby the full current from source 75 and bars 15 and 17 reenters and flows in magnet 13. Thus, the resistance 23 insures that the current increase in magnet 13 is uniform.

The advantages of efficiency are also apparent from the apparatus of FIGS. 3 and 4. In FIG. 3 for example, the dissimilar metals in bars 15 and 17 are at room temperature at one end thereof and at 17° K. in vessel 43 at the opposite end thereof. Thereby, these bars 15 and 17 produce an electro-motive force that decreases the current input necessary to produce a strong magnetic field in the bore 37 of magnet 13. This lowered current input requirement thus avoids the conventional lead losses due to resistance and the consequent inefficiencies of the heating therein produced by lead resistance losses. Moreover, the electromotive force produced by bars 15 and 17 provides an inexpensive and efficient means for providing a smoothly increasing current in magnet 13 for reducing flux jumps therein while the resistance 23 is small whereby it functions as a by-pass for the current from source 75 when flux jumps in magnet 13 raise the resistivity in the magnet 13 above that of resistance 23. Thus the current from source 75 is by-passed to flow through resistance 23 whereby the flux jumps are rapidly removed and after the flux jumps are removed, the current from source 75 again flows through magnet 13 instead of resistance 23.

In still another aspect, the bars 15 and 17 form internal tapered channels 51 and 53. These channels may be machined or as shown in FIG. 3 they may be formed from foil about 010″ thick that is wrapped in a spiral around a hollow center to form the channels 51 and 53. Advantageously, these channels form a narrow cross-sectional opening at their bottom cold ends and a steadily increasing, tapered, cross-sectional opening at their top hot ends. Also, the exit gas is removed through radial holes 77 below the top of bars 15 and 17 for example, below the top of the bars 15 and 17 at their connection with resistance 23.

Referring now to the apparatus shown in FIG. 4, this apparatus also employs a magnet 13, such as the one described in the above-cited Sampson et al. patent, but other superconducting devices requiring large current in a cryogenic environment may alternately be used. Leads 79 and 81 are selectively connected to a variable current source 75, like the one employed with the apparatus of FIG. 3. Heat is carried away from the top of vessel 43 by fins 83, which are air cooled by fan 85 or any suitable cooling source, such as a liquid circulating system, so as to maintain the temperature on the top of the vessel at room ambient, or about 300° K. Multistage, series arranged thermocouples 87 are connected to lead 79 at one end and to bar 15 at the other end to provide a potential in one direction at one end of bar 15, which is connected at its other end to superconducting lead 69 for energizing magnet 13. Like multistage, series arranged thermocouples 89 are connected to lead 81 and bar 17, which is connected at its other end to lead 71 to complete the circuit for energizing magnet 13. The liquid helium 39 in vessel 43 maintains a low temperature at the bottom or cold ends of the bars 15 and 17 while the opposite or hot ends are at a higher temperature to energize magnet 13 to produce a strong kilogauss field in the bore 37 thereof. Thus, the described series arrangement produces a high EMF at a relatively small temperature gradient across bars 15 and 17.

This invention has the advantage of providing a simple, effective, efficient and reliable system for energizing high field superconducting magnets for reducing flux jumps and avoiding quenching therein, and for providing low loss leads therefor. To this end, this invention matches the low output EMF and high current capability of dissimilar metallic bars with the high current requirement of a DC superconductive magnet. Additionally, it advantageously employs the thermal gradient along the current leads into a superconducting magnet or other such device in a cryogenic environment.

What is claimed is:

1. Apparatus (11) for energizing a coiled superconductor forming a magnet (13) subject to localized, normal resistance flux jumps and having a bore (37) for producing a magnetic field therein, comprising:
   (a) thermoelectrically dissimilar, metallic means (15 and 17) forming first ends (25 and 27) having a low resistance connection therebetween, opposite second ends (31 and 33) connected with the opposite ends of said coiled superconductor to form an endless circuit therewith, and channels (51 and 53) extending longitudinally along said metallic means between said first and second ends thereof;
   (b) cooling means (39), comprising a cryogenic fluid for causing said superconductor to have zero resistance therein while cooling said second ends of said metallic means to a low temperature and supplying cryogenic fluid flow in said cooling channels; and
   (c) heat source means (35) at the first ends of said metallic means for providing a temperature differential between said first and second ends of said metallic means for producing a corresponding current flow in said superconductor, and a corresponding magnet field in said bore of said magnet, while said cryogenic fluid flow in said cooling channels minimizes heat input from said heat source means (35) to said cooling means (39), for efficiently producing a strong magnetic field in said bore (37) of said magnet (13), and for reducing said localized normal resistance flux jumps therein.

2. The invention of claim 1 wherein said metallic means (15 and 17), comprise bars formed of pure copper and nickel having a variable external, DC, high current, power supply source (75) for supplying current from said source to said superconductor magnet through said metallic means.

3. The invention of claim 2 in which said bars have multistage, series connected thermocouples attached between said bars and said power supply source.

4. The invention of claim 1 in which said metallic means (15 and 17), comprise bars formed from foil coiled in a spiral around said cooling channels (51 and 53) to provide said fluid flow therein along a tapered cross-section, and said cooling means (39), comprise liquid helium that evaporates through said cooling channels along said tapered cross-section to cool said bars below said heat source means (35).

References Cited

UNITED STATES PATENTS

| | | | |
|---|---|---|---|
| 2,410,128 | 10/1946 | Paille | 136—207 |
| 3,187,235 | 6/1965 | Berlincourt et al. | 335—216 |

GEORGE HARRIS, Primary Examiner

U.S. Cl. X.R.

136—207